(12) United States Patent
Bhushan et al.

(10) Patent No.: US 11,620,548 B1
(45) Date of Patent: Apr. 4, 2023

(54) SYSTEM, METHOD, AND COMPUTER PROGRAM PRODUCT FOR PREDICTING PARASITICS IN AN ELECTRONIC DESIGN

(71) Applicant: Cadence Design Systems, Inc., San Jose, CA (US)

(72) Inventors: Sai Bhushan, Greater Noida (IN); Elias Lee Fallon, Allison Park, PA (US); Chirag Ahuja, Melbourne (AU)

(73) Assignee: Cadence Design Systems, Inc., San Jose, CA (US)

( * ) Notice: Subject to any disclaimer, the term of this patent is extended or adjusted under 35 U.S.C. 154(b) by 343 days.

(21) Appl. No.: 16/898,702

(22) Filed: Jun. 11, 2020

(51) Int. Cl.
*G06F 30/3308* (2020.01)
*G06F 30/27* (2020.01)
*G06N 5/04* (2023.01)
*G06N 5/00* (2023.01)
*G06N 20/20* (2019.01)

(52) U.S. Cl.
CPC .............. *G06N 5/04* (2013.01); *G06F 30/27* (2020.01); *G06F 30/3308* (2020.01); *G06N 5/003* (2013.01); *G06N 20/20* (2019.01)

(58) Field of Classification Search
CPC .......... G06N 5/04; G06N 5/003; G06N 20/20; G06F 30/27; G06F 30/3308
See application file for complete search history.

(56) References Cited

U.S. PATENT DOCUMENTS

| | | | | |
|---|---|---|---|---|
| 6,880,138 B1* | 4/2005 | Teig | ...................... | G06F 30/367 716/115 |
| 8,769,456 B1* | 7/2014 | Krishnan | ................ | G06F 30/39 716/112 |
| 9,798,840 B1* | 10/2017 | Ginetti | .................... | G06F 30/20 |
| 2010/0083200 A1* | 4/2010 | Song | ..................... | G06F 30/367 716/106 |
| 2019/0114381 A1* | 4/2019 | Lin | ......................... | G06F 30/39 |
| 2021/0248299 A1* | 8/2021 | Kourkoulos | .......... | G06F 30/398 |

* cited by examiner

*Primary Examiner* — Nghia M Doan
(74) *Attorney, Agent, or Firm* — Mark H. Whittenberger; Holland & Knight LLP

(57) ABSTRACT

The present disclosure relates to a computer-implemented method for electronic design is provided. Embodiments may include receiving, using at least one processor, an electronic design having an original schematic associated therewith and extracting one or more features for each net from the schematic. Embodiments may include storing one or more resistance or capacitance values for each net and applying the one or more resistance or capacitance values as labels for a machine learning model. Embodiments may also include training the machine learning model using one or more actual values to generate a trained model. Embodiments may further include receiving the trained model to predict parasitics for a stitching engine and generating a stitched schematic.

20 Claims, 16 Drawing Sheets

SYSTEM, METHOD, AND COMPUTER PROGRAM PRODUCT FOR PREDICTING PARASITICS IN AN ELECTRONIC DESIGN

GOVERNMENT RIGHTS

This invention was made with Government support under Agreement No. HR0011-18-3-0010, awarded by DARPA. The Government has certain rights in the invention.

FIELD OF THE INVENTION

The present disclosure relates to electronic circuit design, and more specifically, to predicting various parasitics associated with electronic designs.

DISCUSSION OF THE RELATED ART

In existing electronic design approaches, most designers either manually create parasitic estimates for their designs based on their past knowledge or have some data-mining utility to provide some heuristics. Unfortunately, entering this data manually is a labor intensive task. Moreover, only experienced experts may have enough knowledge to provide any reasonable estimates.

SUMMARY

In one or more embodiments of the present disclosure, a computer-implemented method for electronic design is provided. The method may include receiving, using at least one processor, an electronic design having an original schematic associated therewith and extracting one or more features for each net from the schematic. Embodiments may include storing one or more resistance or capacitance values for each net and applying the one or more resistance or capacitance values as labels for a machine learning model. Embodiments may also include training the machine learning model using one or more actual values to generate a trained model. Embodiments may further include receiving the trained model to predict parasitics for a stitching engine and generating a stitched schematic.

One or more of the following features may be included. In some embodiments, the machine learning model may be a resistance model and/or a capacitance model. Training the machine learning model may be based upon, at least in part, a random forest learning methodology. Receiving an electronic design may include receiving a placed and routed layout for training the machine learning model and only a schematic for predicting parasitics using the trained model. The method may include predicting one or more resistance values based upon, at least in part, the trained machine learning resistance model. The method may further include predicting one or more capacitance values based upon, at least in part, the trained machine learning capacitance model. The method may also include generating, without requiring a user to manually add net parasitics, one or more electrical constraints based upon, at least in part, the one or more predicted resistance values. The method may also include generating, without requiring a user to manually add net parasitics, one or more electrical constraints based upon, at least in part, the one or more predicted capacitance values. The method may further include generating a scratch layout to identify an estimated placement for one or more instances associated with the electronic design.

In yet another embodiment of the present disclosure a non-transitory computer readable medium having stored thereon instructions that when executed by a processor result in one or more operations is included. Operations may include receiving, using at least one processor, an electronic design having an original schematic associated therewith and extracting one or more features for each net from the schematic. Embodiments may include storing one or more resistance or capacitance values for each net and applying the one or more resistance or capacitance values as labels for a machine learning model. Embodiments may also include training the machine learning model using one or more actual values to generate a trained model. Embodiments may further include receiving the trained model to predict parasitics for a stitching engine and generating a stitched schematic.

One or more of the following features may be included. In some embodiments, the machine learning model may be a resistance model and/or a capacitance model. Training the machine learning model may be based upon, at least in part, a random forest learning methodology. Receiving an electronic design may include receiving a placed and routed layout for training the machine learning model and only a schematic for predicting parasitics using the trained model. Operations may include predicting one or more resistance values based upon, at least in part, the trained machine learning resistance model. Operations may further include predicting one or more capacitance values based upon, at least in part, the trained machine learning capacitance model. Operations may also include generating, without requiring a user to manually add net parasitics, one or more electrical constraints based upon, at least in part, the one or more predicted resistance values. Operations may also include generating, without requiring a user to manually add net parasitics, one or more electrical constraints based upon, at least in part, the one or more predicted capacitance values. Operations may further include generating a scratch layout to identify an estimated placement for one or more instances associated with the electronic design.

In one or more embodiments of the present disclosure, a system for electronic design is provided. The system may include a computing device having at least one processor configured to perform one or more operations. Operations may include receiving, using at least one processor, an electronic design having an original schematic associated therewith and extracting one or more features for each net from the schematic. Embodiments may include storing one or more resistance or capacitance values for each net and applying the one or more resistance or capacitance values as labels for a machine learning model. Embodiments may also include training the machine learning model using one or more actual values to generate a trained model. Embodiments may further include receiving the trained model to predict parasitics for a stitching engine and generating a stitched schematic.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

DETAILED DESCRIPTION

Figure 1:
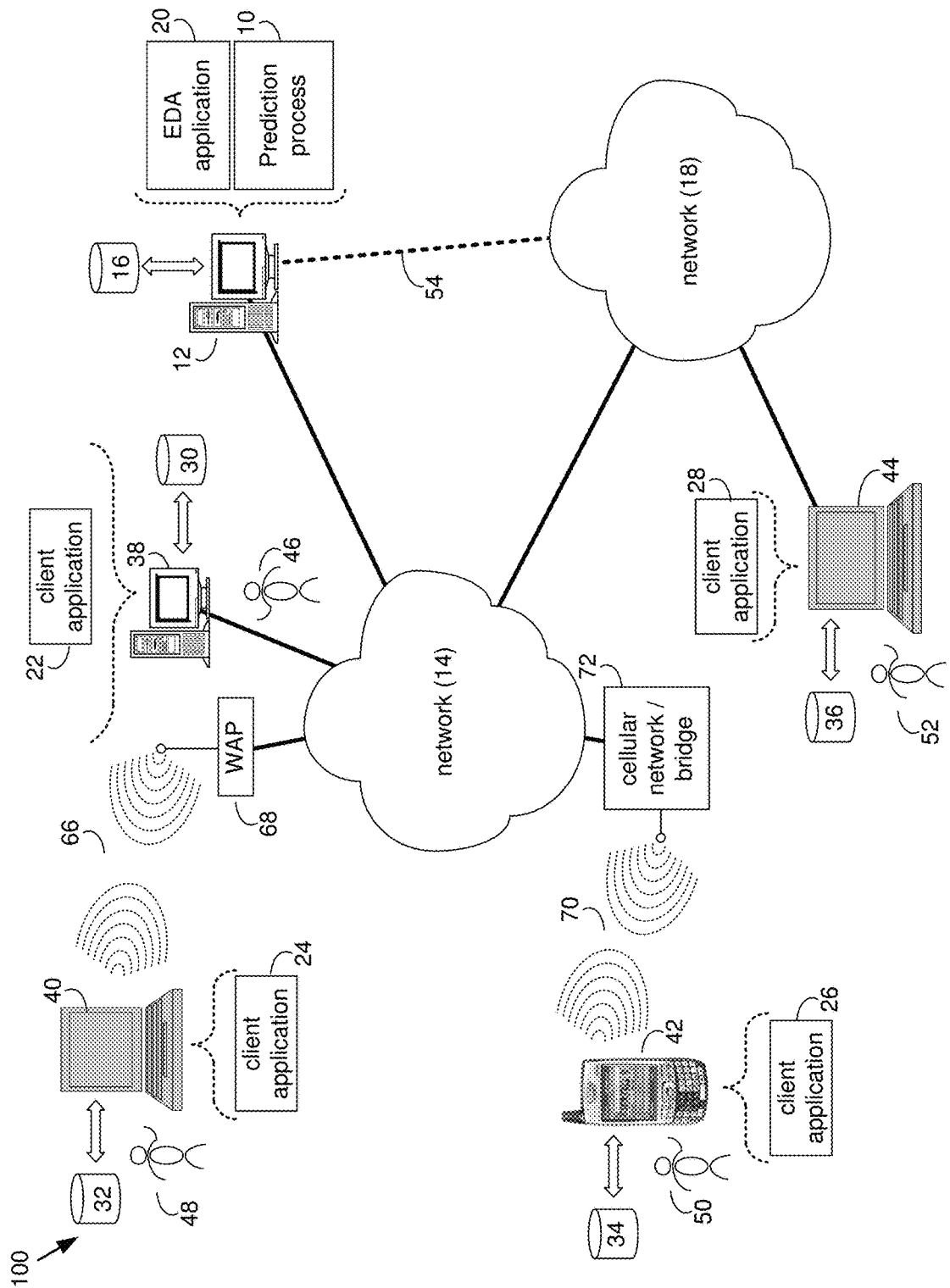
FIG. 1 is a diagram depicting an embodiment of a system in accordance with the present disclosure.

Embodiments of the present disclosure are directed towards a methodology that uses an electronic design schematic as an input and then extracts one or more features based on the devices included therein and their connectivity. The system may then use those features to predict parasitics using a machine learning regression model to predict resistances and capacitances. Accordingly, embodiments included herein are able to predict the parasitics for a given circuit schematic without any routed layout, therefore providing the benefit of occurring all at a pre-layout stage.

Reference will now be made in detail to the embodiments of the present disclosure, examples of which are illustrated in the accompanying drawings. The present disclosure may, however, be embodied in many different forms and should not be construed as being limited to the embodiments set forth herein. Rather, these embodiments are provided so that this disclosure will be thorough and complete, and will fully convey the concept of the disclosure to those skilled in the art.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

As used in any embodiment described herein, "circuitry" may include, for example, singly or in any combination, hardwired circuitry, programmable circuitry, state machine circuitry, and/or firmware that stores instructions executed by programmable circuitry. It should be understood at the outset that any of the operations and/or operative components described in any embodiment herein may be implemented in software, firmware, hardwired circuitry and/or any combination thereof.

Any suitable computer usable or computer readable medium may be utilized. The computer readable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

One or more hardware description languages may be used in accordance with the present disclosures. Some hardware description languages may include, but are not limited to, Verilog, VHDL, and Verilog-AMS. Various other hardware description languages may also be used as well.

Referring to FIG. 1, there is shown prediction process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® Server; Novell® NetWare®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.) Additionally/alternatively, process 10 may reside on and be executed, in whole or in part, by a client electronic device, such as a personal computer, notebook computer, personal digital assistant, or the like.

The instruction sets and subroutines of prediction process 10, which may include one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid state drive, a tape drive; an optical drive; a RAID array; a random access memory (RAM); and a read-only memory (ROM). Storage device 16 may include various types of files and file types including but not limited, to hardware description language (HDL) files, which may contain the port type descriptions and executable specifications of hardware blocks.

Server computer 12 may execute a web server application, examples of which may include but are not limited to: Microsoft IIS, Novell Webserver™, or Apache® Webserver, that allows for HTTP (e.g., HyperText Transfer Protocol) access to server computer 12 via network 14 (Webserver is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network; or an intranet, for example.

Server computer 12 may execute an electronic design automation (EDA) application (e.g., EDA application 20), examples of which may include, but are not limited to those available from the assignee of the present application. EDA application 20 may interact with one or more EDA client applications (e.g., EDA client applications 22, 24, 26, 28) for electronic design optimization.

Prediction process 10 may be a stand alone application, or may be an applet/application/script that may interact with and/or be executed within EDA application 20. In addition/as an alternative to being a server-side process, the prediction process may be a client-side process (not shown) that may reside on a client electronic device (described below) and may interact with an EDA client application (e.g., one or more of EDA client applications 22, 24, 26, 28). Further, the prediction process may be a hybrid server-side/client-side process that may interact with EDA application 20 and an EDA client application (e.g., one or more of client applications 22, 24, 26, 28). As such, the processes may reside, in whole, or in part, on server computer 12 and/or one or more client electronic devices.

The instruction sets and subroutines of EDA application 20, which may be stored on storage device 16 coupled to server computer 12 may be executed by one or more processors (not shown) and one or more memory modules (not shown) incorporated into server computer 12.

The instruction sets and subroutines of EDA client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drives, tape drives; optical drives; RAID arrays; random access memories (RAM); read-only memories (ROM), compact flash (CF) storage devices, secure digital (SD) storage devices, and a memory stick storage devices. Examples of client electronic devices 38, 40, 42, 44 may include, but are not limited to, personal computer 38, laptop computer 40, mobile computing device 42 (such as a smart phone, netbook, or the like), notebook computer 44, for example. Using client applications 22, 24, 26, 28, users 46, 48, 50, 52 may access EDA application 20 and may allow users to e.g., utilize prediction process 10.

Users 46, 48, 50, 52 may access EDA application 20 directly through the device on which the client application (e.g., client applications 22, 24, 26, 28) is executed, namely client electronic devices 38, 40, 42, 44, for example. Users 46, 48, 50, 52 may access EDA application 20 directly through network 14 or through secondary network 18. Further, server computer 12 (e.g., the computer that executes EDA application 20) may be connected to network 14 through secondary network 18, as illustrated with phantom link line 54. Some or all of the operations discussed herein with regard to prediction process 10 may be performed, in whole or in part, in the cloud as a cloud-based process including, for example, networks 14, 18 and any others.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 66 established between laptop computer 40 and wireless access point (e.g., WAP) 68, which is shown directly coupled to network 14. WAP 68 may be, for example, an IEEE 802.11a, 802.11b, 802.11g, Wi-Fi, and/or Bluetooth device that is capable of establishing wireless communication channel 66 between laptop computer 40 and WAP 68. Mobile computing device 42 is shown wirelessly coupled to network 14 via wireless communication channel 70 established between mobile computing device 42 and cellular network/bridge 72, which is shown directly coupled to network 14.

As is known in the art, all of the IEEE 802.11x specifications may use Ethernet protocol and carrier sense multiple access with collision avoidance (e.g., CSMA/CA) for path sharing. The various 802.11x specifications may use phase-shift keying (e.g., PSK) modulation or complementary code keying (e.g., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows, Microsoft Windows CE®, Red Hat Linux, or other suitable operating system. (Windows CE is a registered trademark of Microsoft Corporation in the United States, other countries, or both.)

Figure 2:
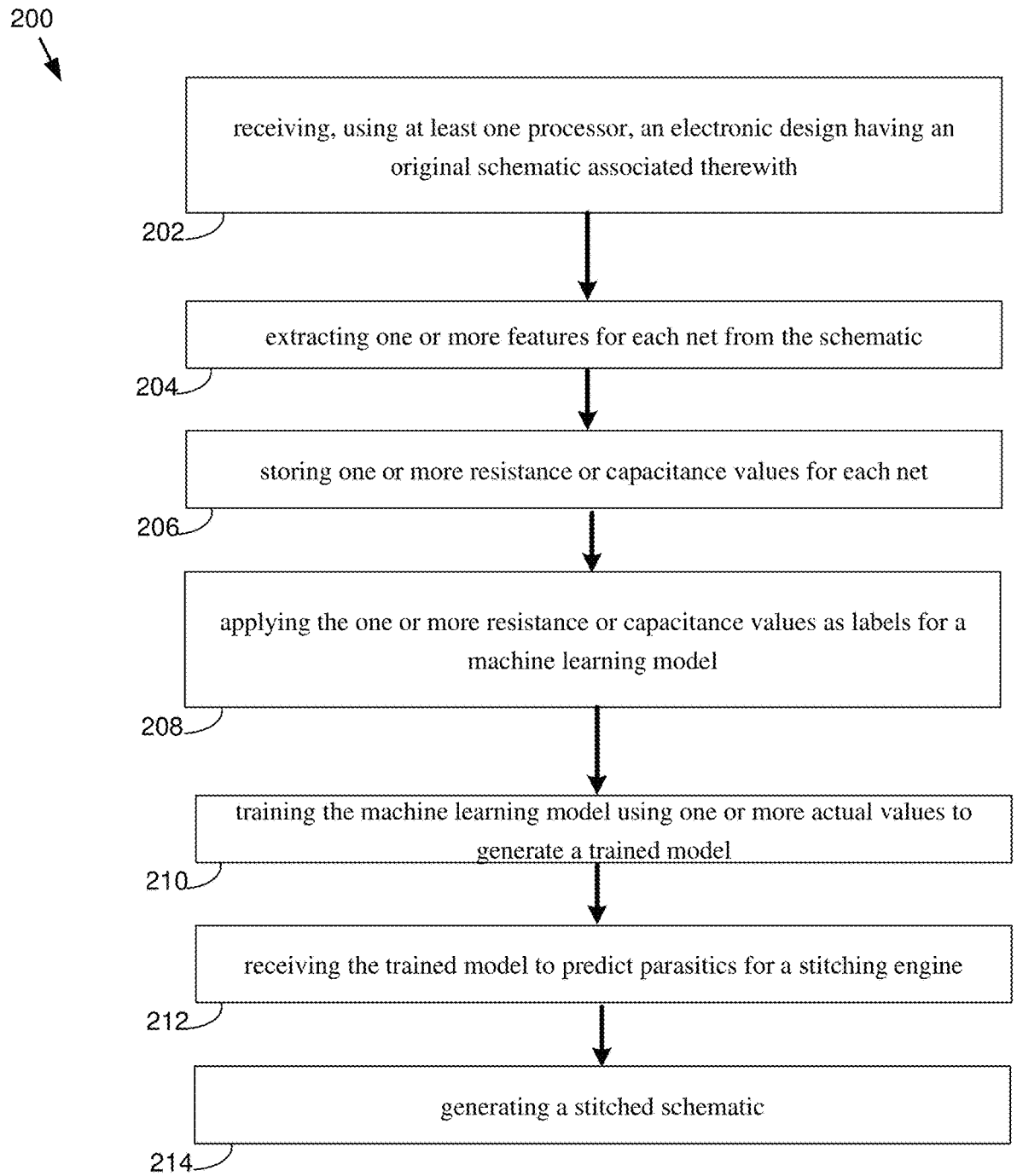
FIG. 2 is a flowchart depicting operations consistent with the prediction process in accordance with an embodiment of the present disclosure.

Referring now to FIG. 2, an example flowchart depicting operations consistent with an embodiment of prediction process 10 is provided. The process may include receiving (202), using at least one processor, an electronic design having an original schematic associated therewith and extracting (204) one or more features for each net from the schematic. Embodiments may include storing (206) one or more resistance or capacitance values for each net and applying (208) the one or more resistance or capacitance values as labels for a machine learning model. Embodiments may also include training (210) the machine learning model using one or more actual values to generate a trained model. Embodiments may further include receiving (212) the trained model to predict parasitics for a stitching engine and generating (214) a stitched schematic. Numerous other operations are also within the scope of the present disclosure.

Referring now to FIGS. 3-21, embodiments of prediction process 10 may be configured to perform parasitics prediction from schematic features using one or more machine learning techniques. As discussed herein, prediction process 10 may receive a schematic associated with an electronic design and may predict one or more parasitics (e.g., R and C Values) for all associated nets. Embodiments of prediction process 10 may be configured to generate a machine learning model that provides reasonable accuracy for a given technology.

In conventional approaches, the user has to manually add parasitics for each net of the electronic design. In contrast, embodiments of prediction process 10 may use machine learning to predict parasitics based on one or more features extracted from a schematic. This helps in automating the process of adding the estimated parasitics. As such, prediction process 10 may use predicted parasitic values to create electrical constraints automatically, therefore, providing reasonable estimates for parasitics while reducing human effort. The estimated parasitics may be used to achieve better circuit sizing upfront in the pre-layout stage.

Figure 3:
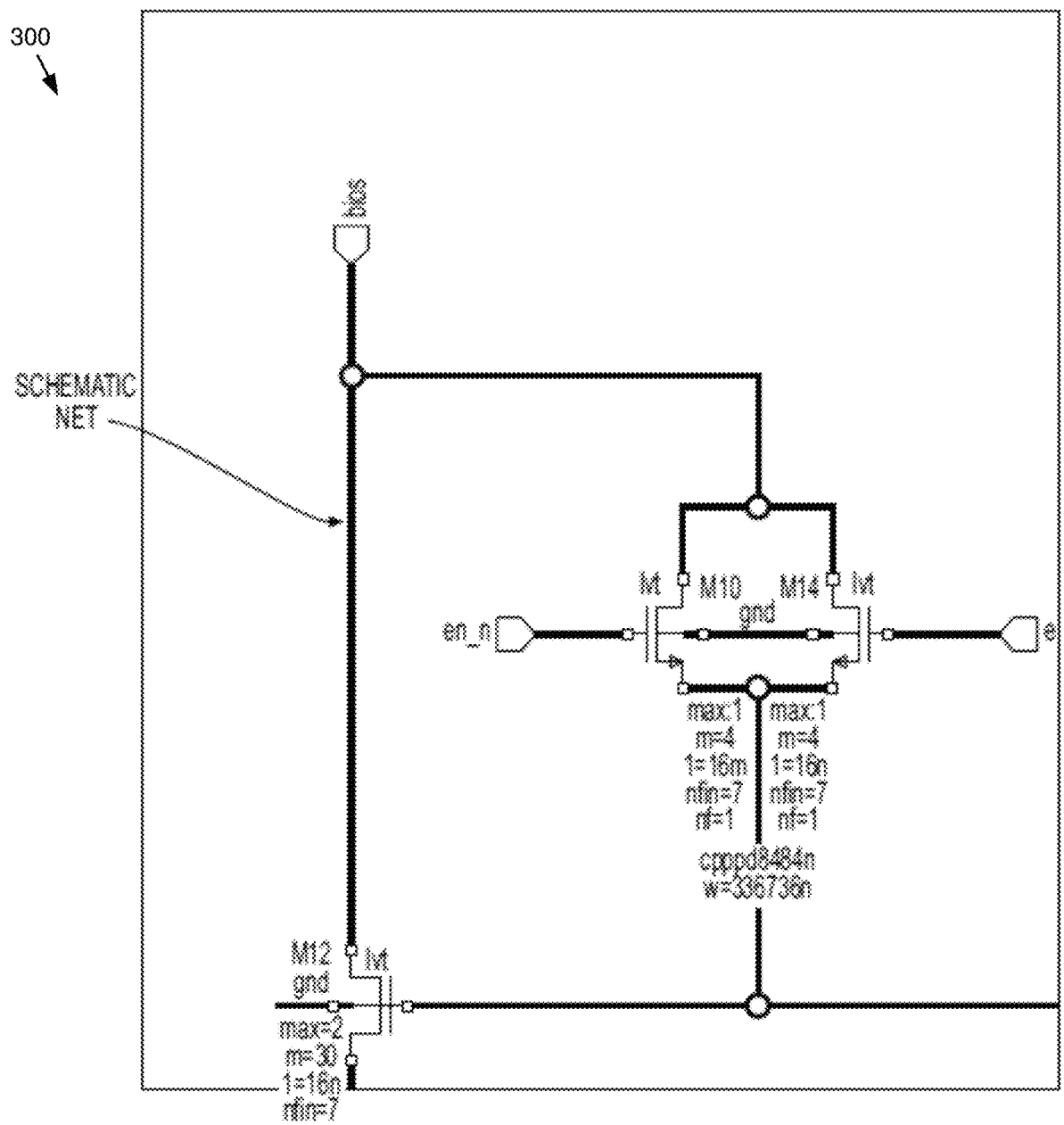
FIG. 3 is a graphical user interface depicting a schematic in accordance with an embodiment of the present disclosure.

Referring again to FIG. 3, an embodiment showing a graphical user interface 300 depicting a schematic associated with an electronic design is provided. Given a particular schematic, prediction process 10 may be configured to predict one or more parasitics (e.g., R and C Values) for all the nets. One particular schematic net is shown in FIG. 3.

Figure 4:
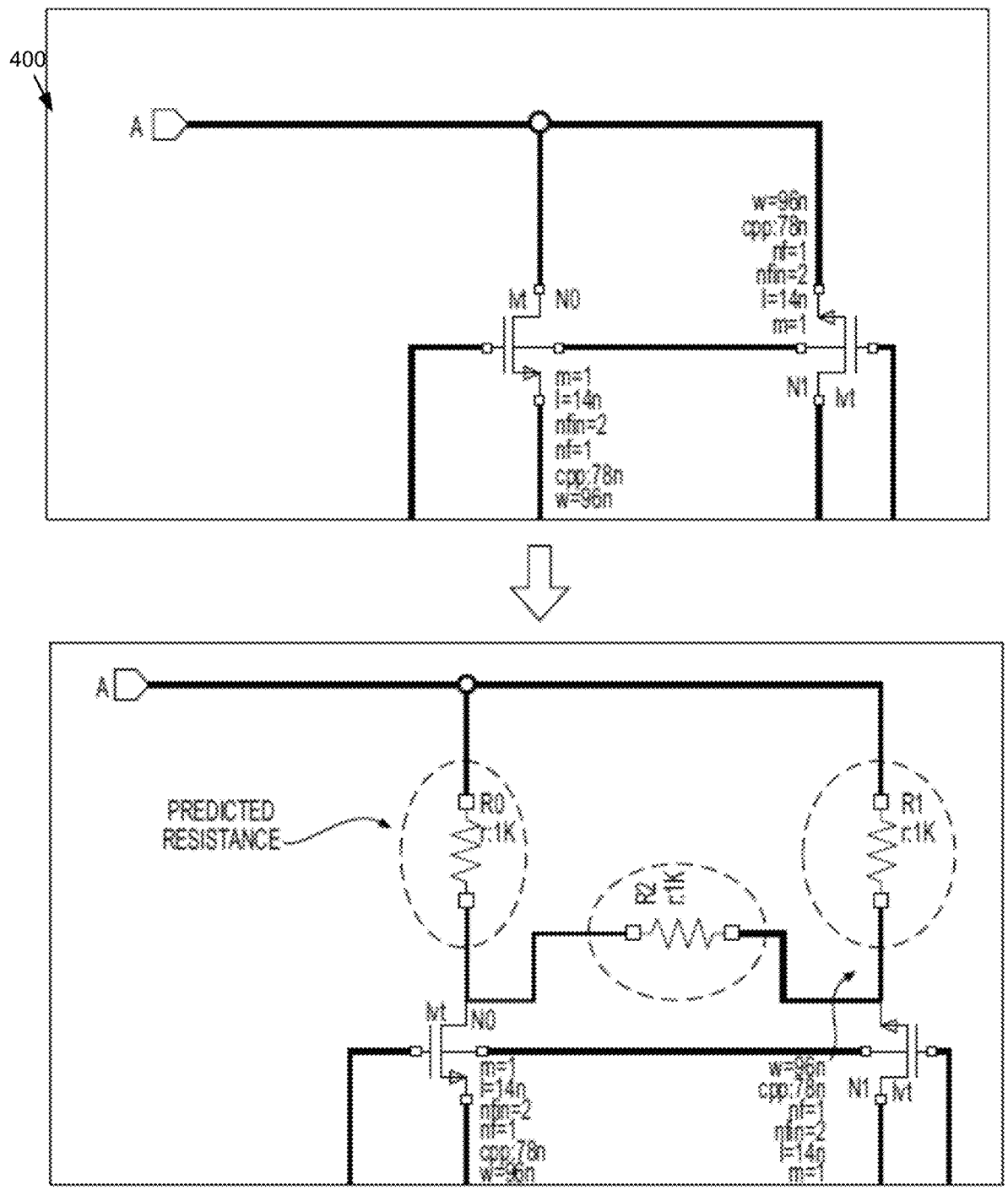
FIG. 4 is a graphical user interface depicting a schematic in accordance with an embodiment of the present disclosure.

Referring now to FIG. 4, another embodiment showing a graphical user interface 400 depicting a schematic associated with an electronic design is provided. In existing systems, the top schematic may be received as an input and the user may need to manually predict the resistances shown in the bottom schematic. In contrast, prediction process 10 may automatically predict a resistance for each path (e.g. terminal to terminal) of a schematic net as is discussed in further detail hereinbelow.

In operation, instead of predicting the resistance of a schematic net, prediction process 10 may first create a scratch layout and perform a quick placement strategy to obtain some placement estimates for the instances. The scratch layout is discussed in further detail below with reference to FIG. 6. Prediction process 10 may then predict the resistance for each path connecting two pins (e.g., instance-terminals or "InstTerms"). For example, as shown in the bottom portion of graphical user interface 400, if a net is connected to "n" instance terminals, prediction process 10 may then generate $^nC_2$ resistors. For example, there may be a path-resistance predicted for every pair of instance-terminals and therefore it may result in $^nC_2$ resistors, one for each path (as shown in FIG. 4 where the net connects to 3 instance-terminals and model predicts 3 resistors for each of the $^3C_2$ paths. Prediction process 10 may then stitch the resistance of each path in the layout to the schematic. An example of a stitched netlist is provided below with reference to FIG. 7.

In some embodiments, prediction process 10 may utilize multiple designs, which may be used for different aspects of the process. For example, some designs may be used for training of data while others may be used for testing of data. In the example shown in FIG. 4, Design 1 (e.g., "sarclk-gen_static") may be used for training (e.g., 449K InstTerm to InstTerm connections) and Design 2 (e.g., "sarfsm") may be used for testing. For example, while training a machine-learning model, the feature-data and label-data (e.g., parasitic values) may be generated over multiple designs. The data for some of the designs may be used to train the model and the data from any remaining designs may be used to test how well the model is behaving for unseen designs. FIG. 4 depicts how the predicted parasitic resistors may be stitched to schematic.

Figure 5:
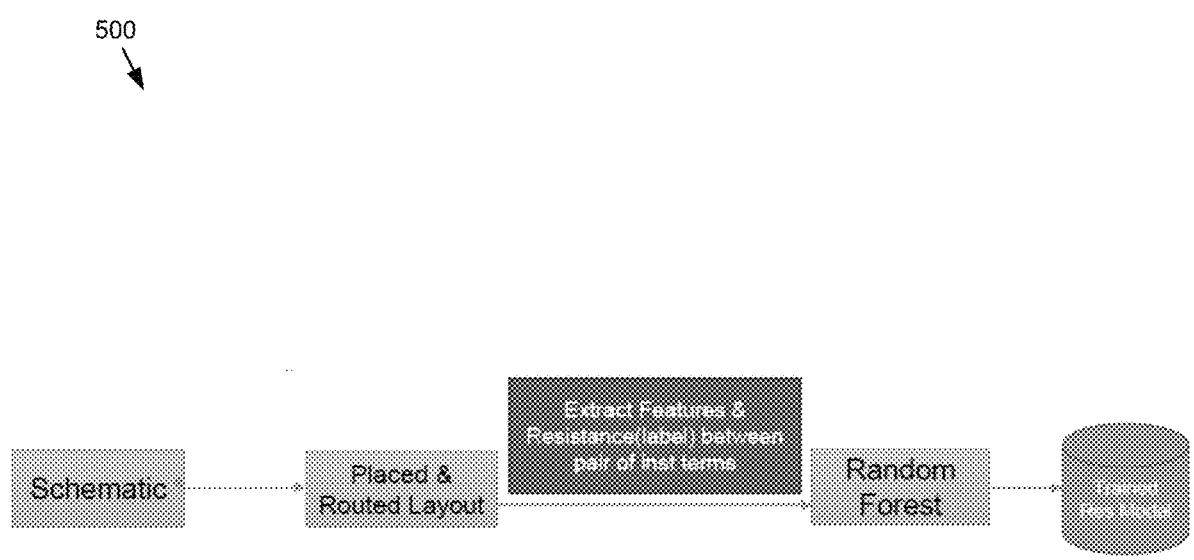
FIG. 5 is a flowchart depicting an example in accordance with an embodiment of the present disclosure.

Referring also to FIG. 5, a flowchart 500 consistent with embodiments of prediction process 10 showing the training of a machine learning model is provided. As shown in the flowchart, prediction process 10 may be configured to receive a schematic and to extract one or more features from a placed and routed layout. Features may be extracted from the schematic for each pair of connections/paths and also from the real layout for each pair of connections/paths. Some features may include, but are not limited to, the manhattan length between two instance terminals, the area occupied by devices inside a rectangle formed by the two instance terminals, the number of instance terminals inside the rectangle formed by two instance terminals, the widths and metal layer of two instance terminals, etc. These features may be extracted from the electronic design using database query application program interfaces ("API"s) or using any other suitable approach. Some particular features such as layer, width, etc. may be read directly from the stored attributes of design objects. However, for some other features like manhattan length or area calculation, the object locations may be processed to get the required information.

In some embodiments, prediction process 10 may extract the resistance or label between two instance terminals (e.g., pins). The machine-learning model for parasitic prediction may include any suitable model, such as, a supervised regression model. In a supervised machine learning model, the actual value, for the entity to be predicted, may be referred to as the 'label' for the model. Accordingly, in this example, the resistance value may be referred to as the label for the resistance prediction model. A machine learning model (e.g., Random Forest, Decision Tree, etc.) may then be applied to generate a trained resistance model. It should be noted that any suitable model may be used without departing from the scope of the present disclosure.

In some embodiments, path resistance values may be stored using an extractor engine associated with EDA application 20 shown in FIG. 1. These resistance values may then be used as labels for the model. The model may be trained using the actual values, tuning the weights to reduce the loss. This training may be performed offline and only the trained model may be provided to the customer for use.

Figure 6:
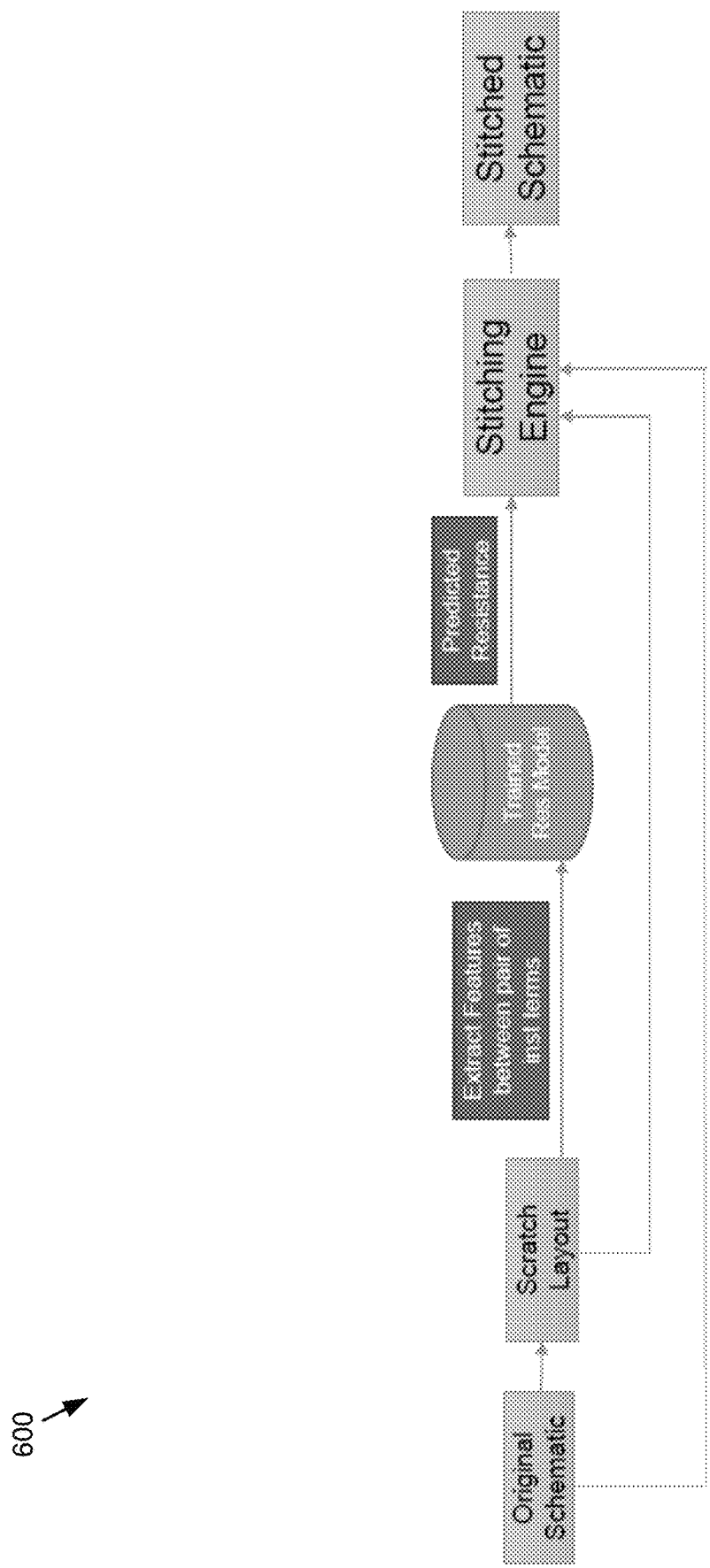
FIG. 6 is a flowchart depicting an example in accordance with an embodiment of the present disclosure.

Referring also to FIG. 6, a flowchart 600 consistent with embodiments of prediction process 10 showing parasitic prediction and stitching is provided. In certain environments the trained model may be used in a variety of ways. For example, in some cases, there may not be any real layout available. Prediction process 10 may generate a quick-layout with some estimated positioning of devices based on their connectivity and device sizes. Features may then be extracted from the schematic and the scratch/dummy layout. These features may then be provided as an input to the trained model to return a predicted resistance path value as output. The resistance path value may then be stitched in the schematic netlist.

In some embodiments, and as discussed above, prediction process 10 may generate a scratch layout as part of the overall process, which is discussed in further detail below. In operation, if the schematic is hierarchical, then it may be flattened. A generate from source ("GFS") operation may be performed on the original schematic to create a dummy layout. The total area of devices may then be calculated. For example, the area for the cell may be taken as five times the total device area and the aspect ratio may be selected as 1.0 (e.g., width and height). Pin sizes and locations may be updated (e.g., locations for the pins may be estimated based on the schematic position for those pins). Prediction process 10 may then perform an estimated placement to place devices in rows based on their sizes and connectivity.

Figure 7:
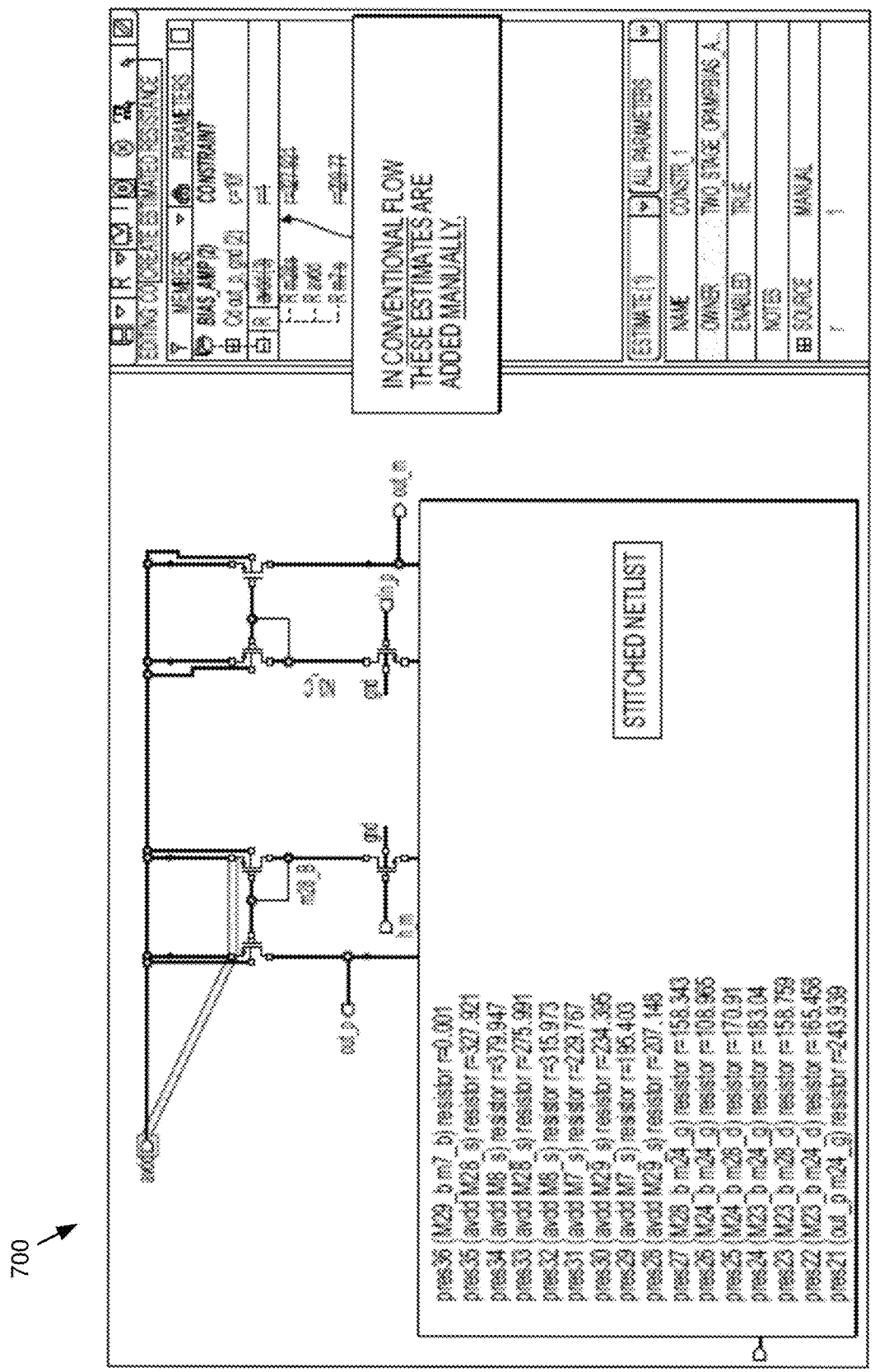
FIG. 7 is a graphical user interface depicting a schematic in accordance with an embodiment of the present disclosure.

Referring now to FIG. 7, another embodiment showing a graphical user interface 700 depicting a schematic associated with an electronic design is provided. GUI 700 displays a stitched netlist and one or more parasitic estimates. In conventional approaches, the parasitic estimates had to be added manually as discussed above.

Figure 8:
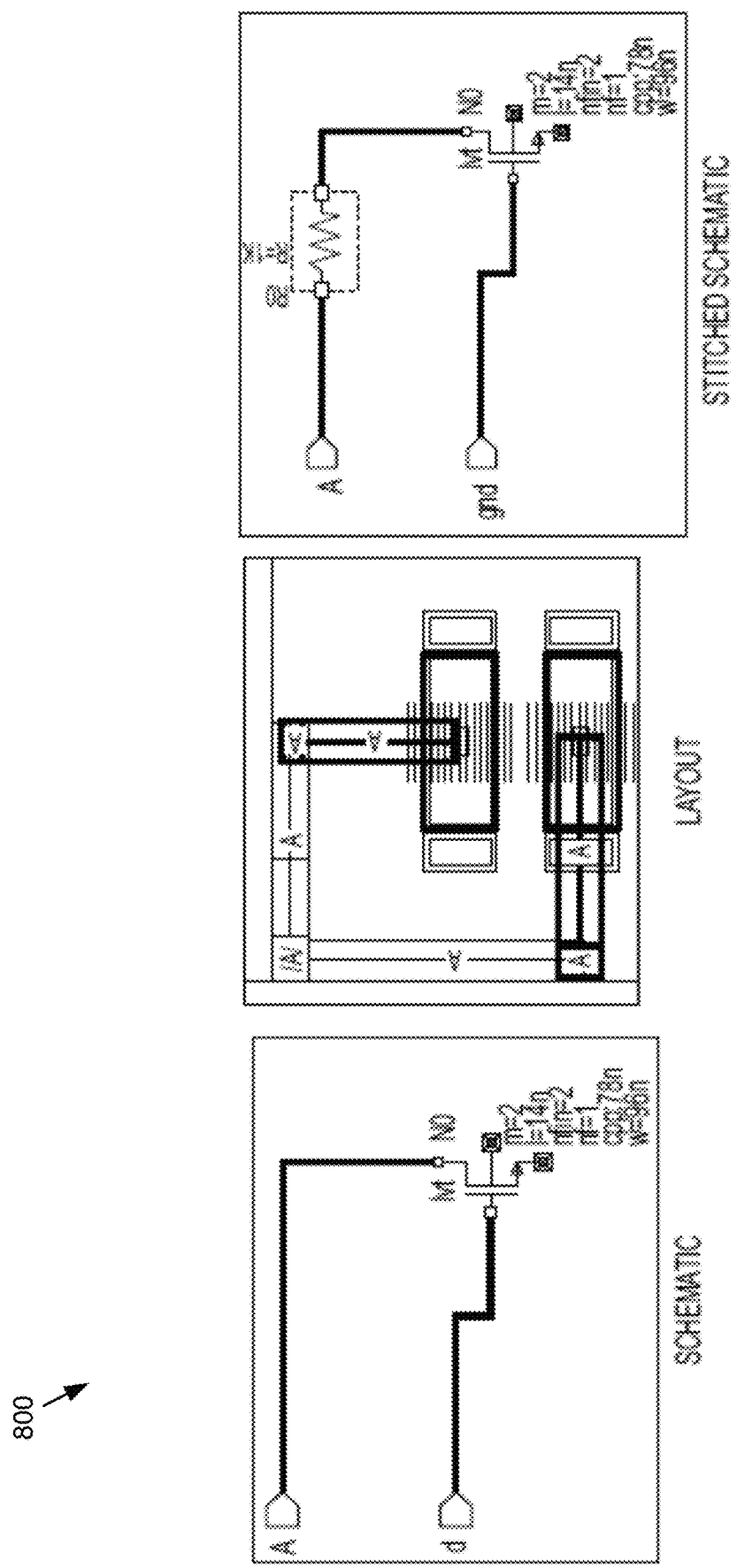
FIG. 8 is a graphical user interface depicting a schematic in accordance with an embodiment of the present disclosure.

Referring now to FIG. 8, graphical user interfaces showing examples of mapping a layout resistance to a schematic are provided. When multiple layout devices are mapped to a single schematic device, then there is a many-to-one mapping between the layout path and the schematic path. In order to find an effective path resistance between two schematic pins, prediction process 10 may determine an average of the path resistance for the multiple layout paths.

Figure 9:
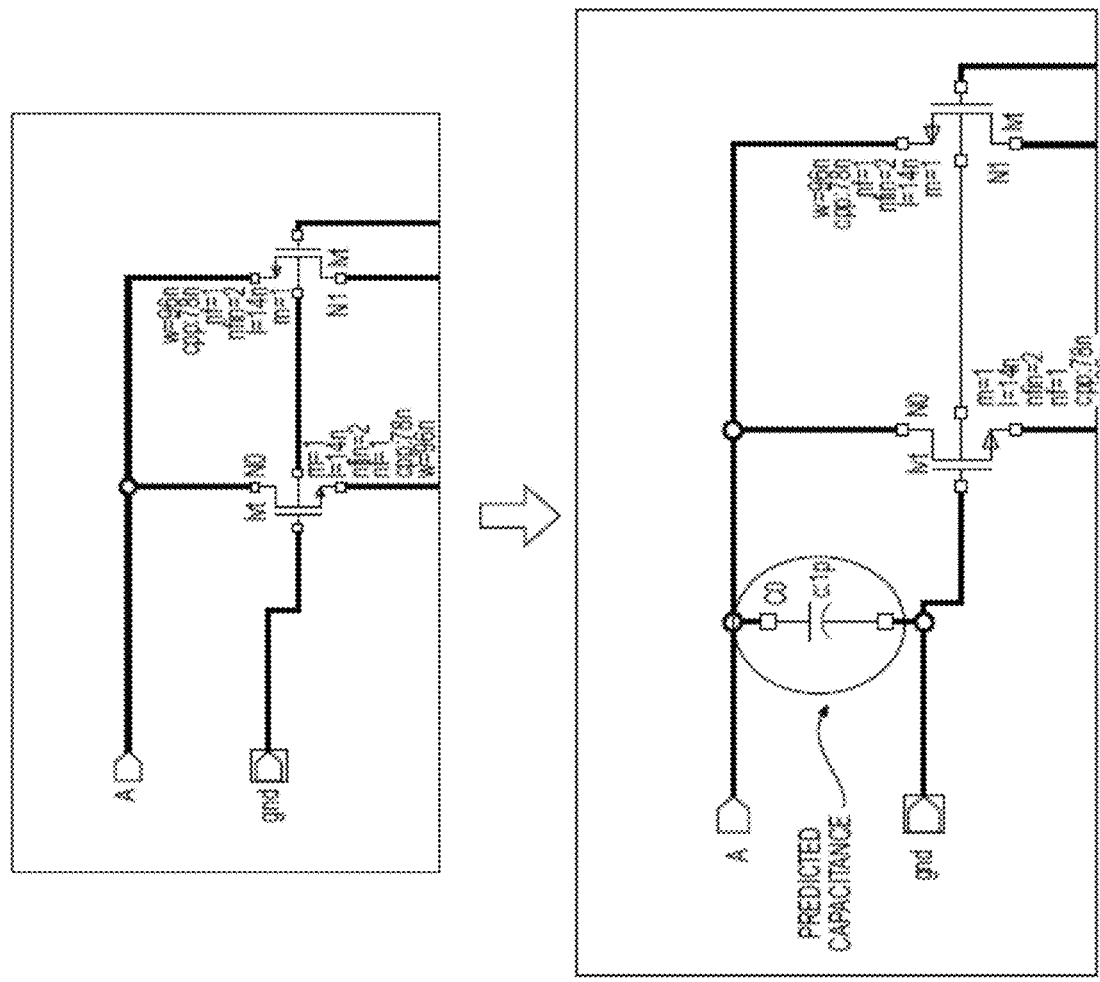
FIG. 9 is a graphical user interface depicting a schematic in accordance with an embodiment of the present disclosure.
Figure 10:
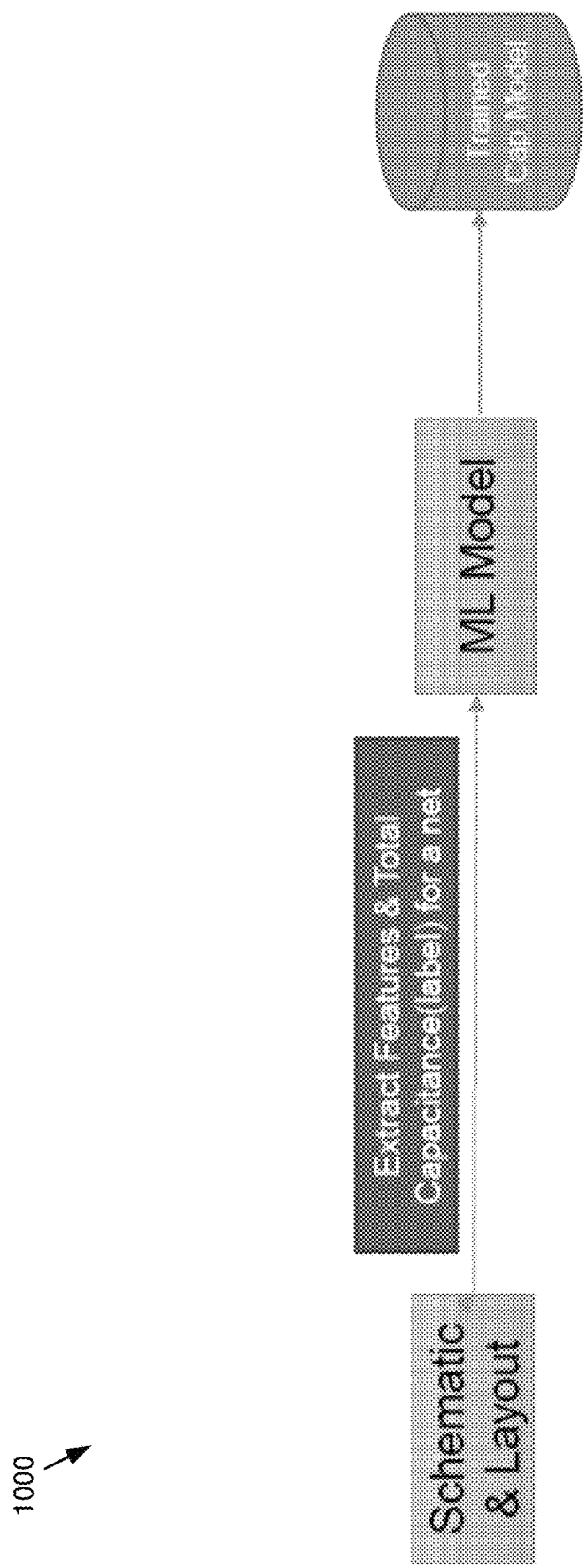
FIG. 10 is a flowchart depicting an example in accordance with an embodiment of the present disclosure.

Referring now to FIGS. 9-16, embodiments of prediction process 10 depicting examples of capacitance prediction are provided. FIG. 9 shows another embodiment including a graphical user interface 900 depicting a schematic associated with an electronic design. In some embodiments, prediction process 10 may predict a total capacitance for each schematic net. For simplicity, in this example, the process may stitch a predicted capacitance with ground net. Here, the schematic features for a net may include, but are not limited to, a sum of one or more mFactors of all the instances connected to net, a sum of one or more sFactors of all the instances connected to net, a number of schematic instance terminals, etc. The 'mFactor' and 'sFactor', as used herein, may refer to one or more parameters on the schematic instance. For example, the "mFactor" property may represent multiplicity, which indicates how many layout devices would be created for a single schematic instance. The "sFactor" property may represent stacking-factor, which may indicate how many layout devices may be stacked for a single schematic instance. These parameters may influence the number of devices that may be generated in the layout for that schematic instance and may therefore impact the number of instance-terminals and impact the connectivity for the net as well. As such, these properties are useful for inclusion into the input feature-set for the machine-learning model.

In this example, the label may correspond to the total capacitance for the net. With regard to data, four designs may be generated in accordance with prediction process 10 (e.g., Genetic Placer→Genetic Router→Extraction) ("sarclkgen_static", "sarfsm", "sarlogic_wret_v2_array" and "sarret_wckbuf"). Here, the total number of nets was 531. The machine-learning model was trained on the four designs listed above by first performing the placement, followed by the routing and then parasitic extraction to obtain the capacitance information for each net. This process is shown in further detail in the flowchart depicted in FIG. 10. The features for the machine learning model may be extracted from the schematic and the capacitance values (e.g., labels) for the machine learning model may be extracted from the routed layout. The features and labels may then be used to train the machine learning model.

Embodiments included herein may analyze an existing placement (e.g., schematic, layouts, .txt files, etc.) as a reference placement and optimize both instances and pins placement together during some embodiments. Moreover, some embodiments may optimize the aspect ratio of a group. Each of these concepts as well as additional genetic placement techniques are discussed in further detail in U.S. patent application Ser. No. 16/527,412, which is incorporated by reference herein in its entirety. A genetic algorithm ("GA") generally refers to a bio-inspired or evolutionary algorithm that may be used for optimization and search problems. A GA may simulate the process of natural selection and evolution. The goal is to find the best "fit" individuals or those with the best genes. It should be noted that although certain embodiments included herein may reference genetic algorithms, any analysis process may be used in accordance with the teachings of the present disclosure.

Referring again to FIG. 10, a flowchart 1000 consistent with embodiments of prediction process 10 showing the training of a machine learning model is provided. As shown in the flowchart, prediction process 10 may be configured to extract one or more features from a schematic and to extract one or more labels from a placed and routed layout. In operation, one or more features may be extracted from the schematic for each net. Capacitance values for each net may then be stored using an extractor engine associated with EDA application 20. These capacitance values may be used as labels for the machine learning model similar to the resistance approach discussed above. The model may be trained using the actual values, tuning the weights to reduce the loss. This training may be performed offline and only the trained model may be given to the customer for use.

Figure 11:
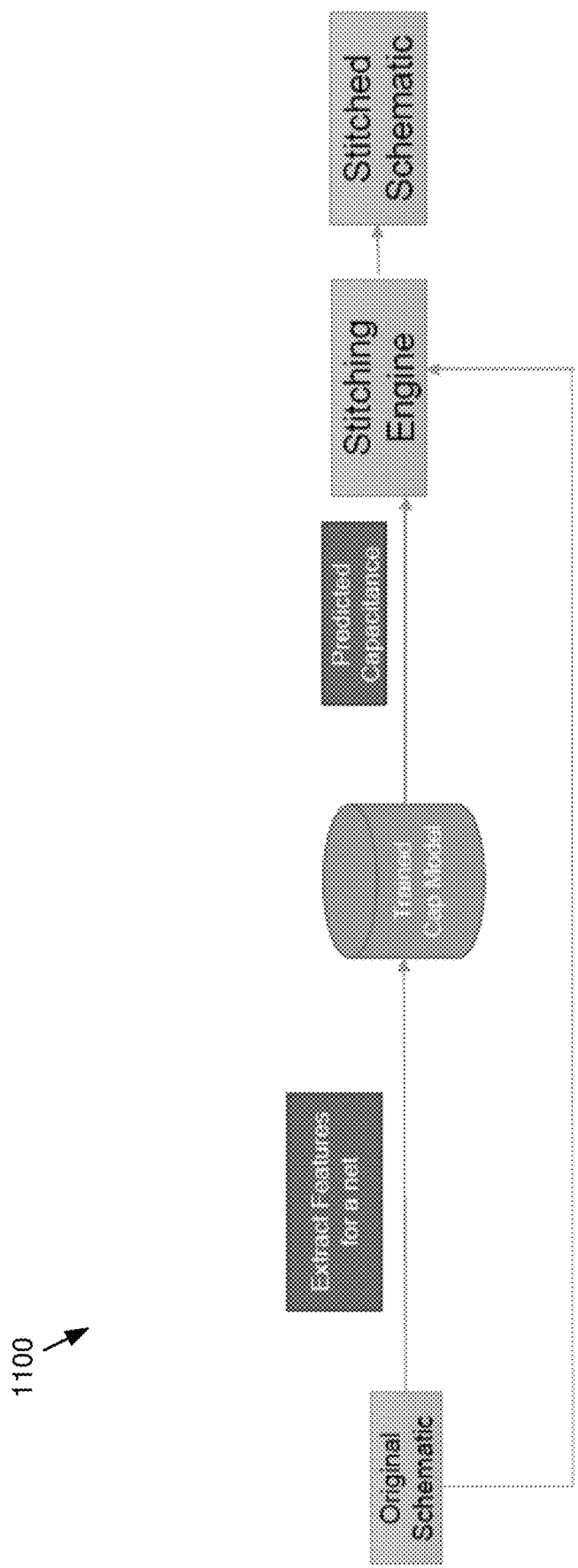
FIG. 11 is a flowchart depicting an example in accordance with an embodiment of the present disclosure.

Referring also to FIG. 11, a flowchart 1100 consistent with embodiments of prediction process 10 showing an example of parasitic prediction and stitching is provided. FIG. 11 shows an example of how the trained model may be used in a particular environment. As shown in the flowchart, prediction process 10 may be configured to extract one or more features from the schematic for each net. These features may then be passed as an input to the trained model to return a predicted capacitance value as output. The capacitance value for the net may then be stitched in the schematic netlist as a coupling capacitance between the net and a reference/ground net.

Figure 12:
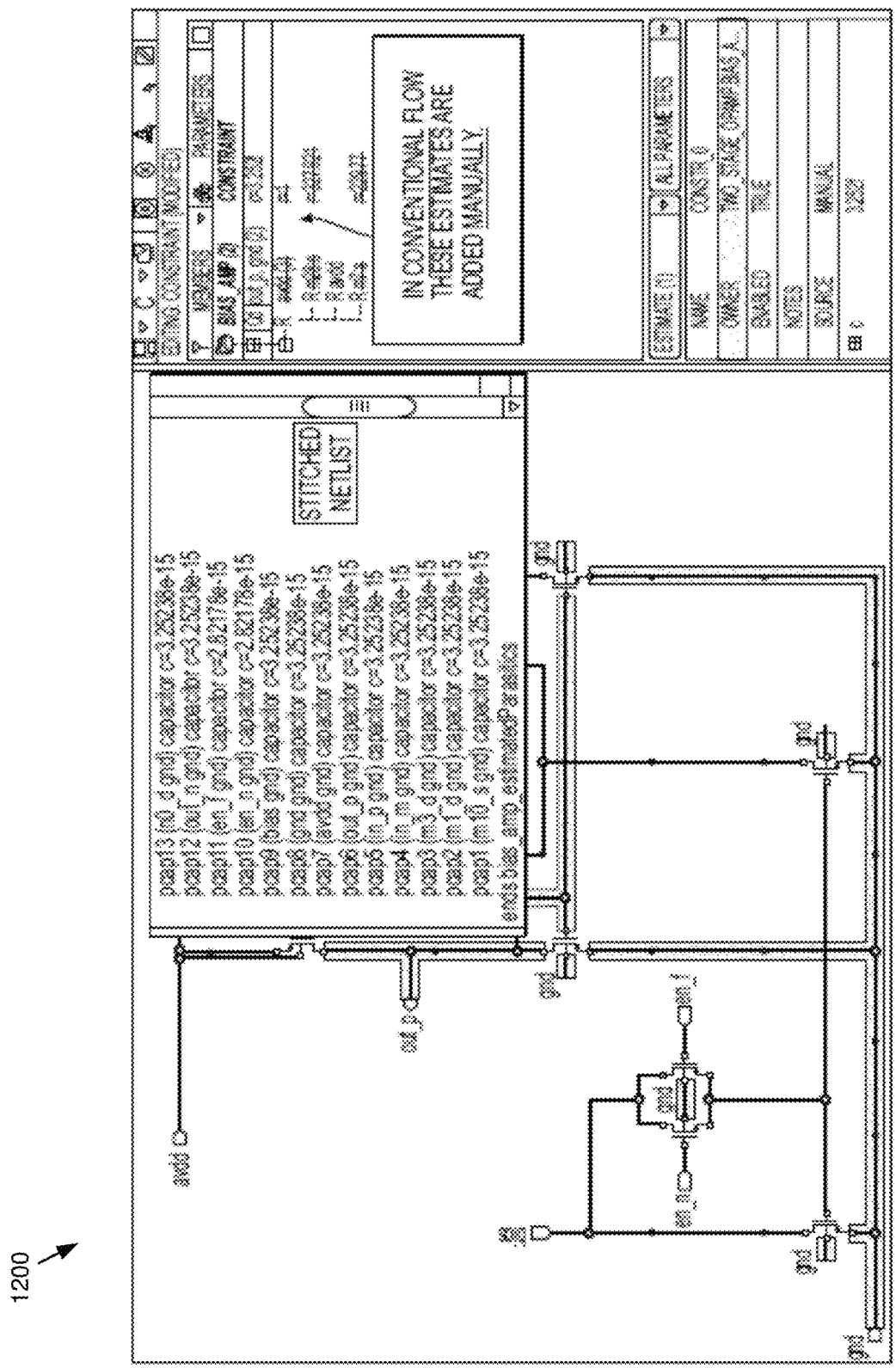
FIG. 12 is a graphical user interface depicting a schematic in accordance with an embodiment of the present disclosure.

Referring now to FIG. 12, another embodiment showing a graphical user interface 1200 depicting a schematic associated with an electronic design is provided. GUI 1200 displays a stitched netlist and one or more parasitic estimates. In conventional approaches, the parasitic estimates had to be added manually as discussed above.

Figure 13:
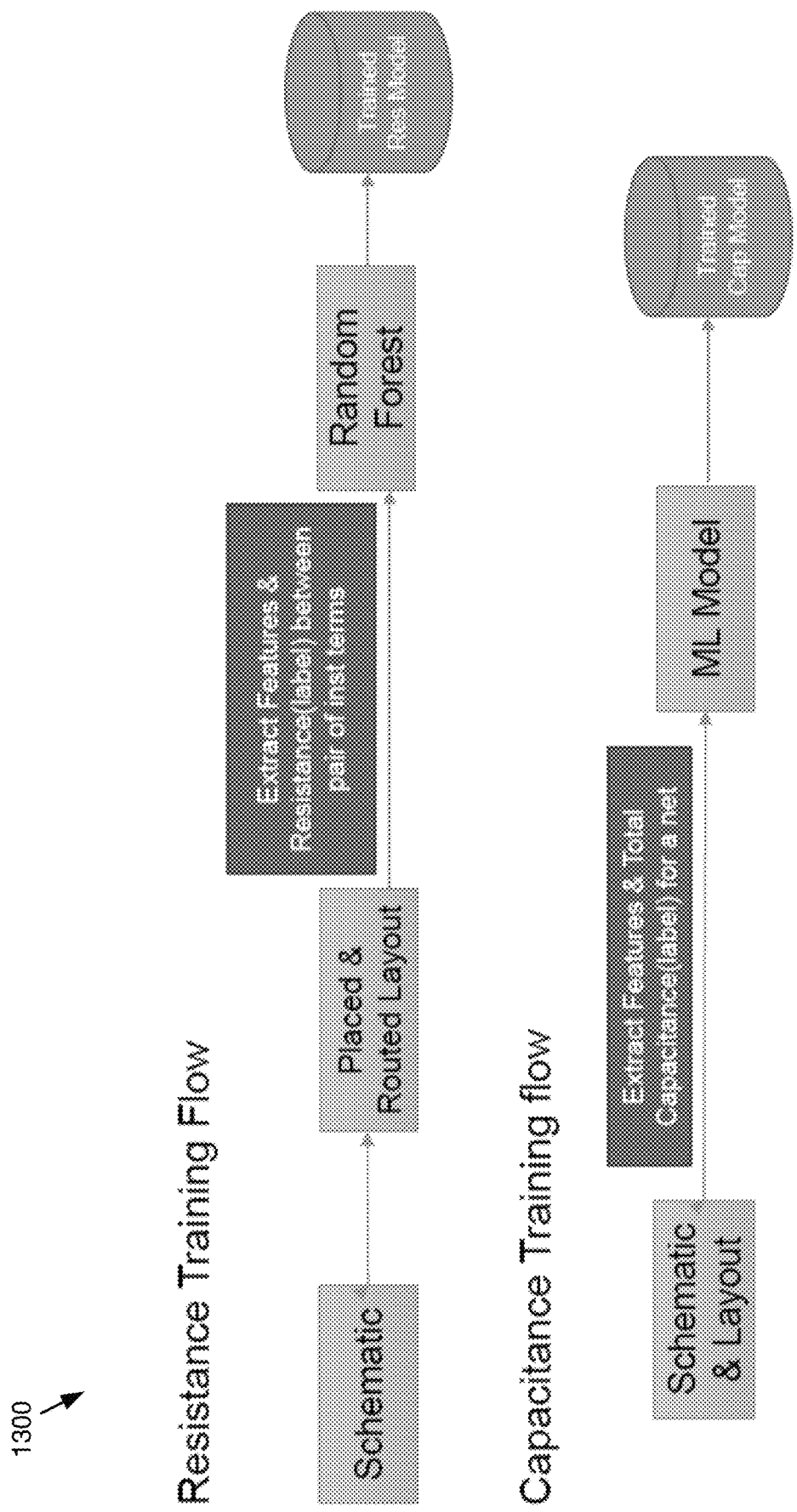
FIG. 13 is a flowchart depicting an example in accordance with an embodiment of the present disclosure.
Figure 14:
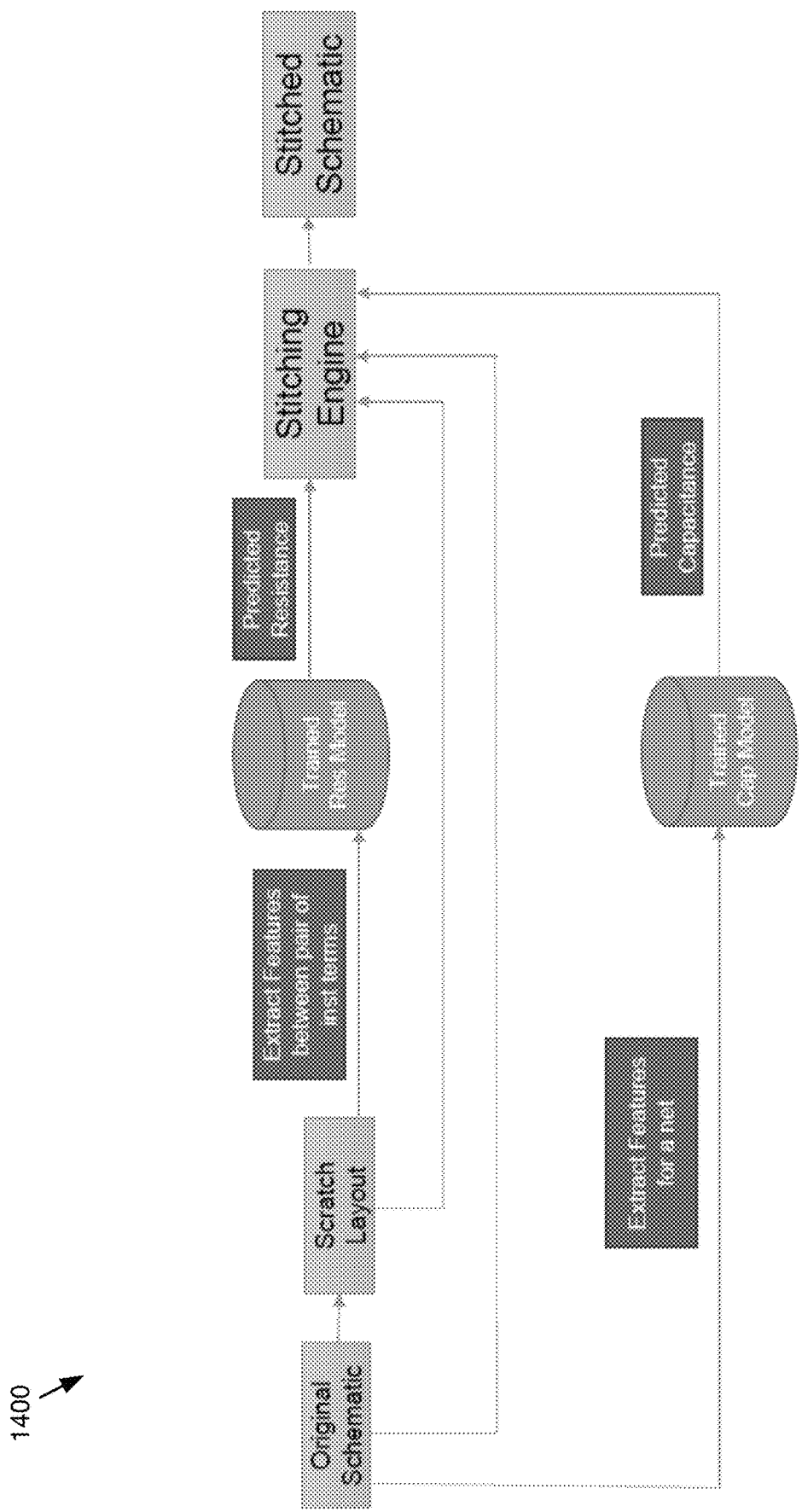
FIG. 14 is a flowchart depicting an example in accordance with an embodiment of the present disclosure.
Figure 15:
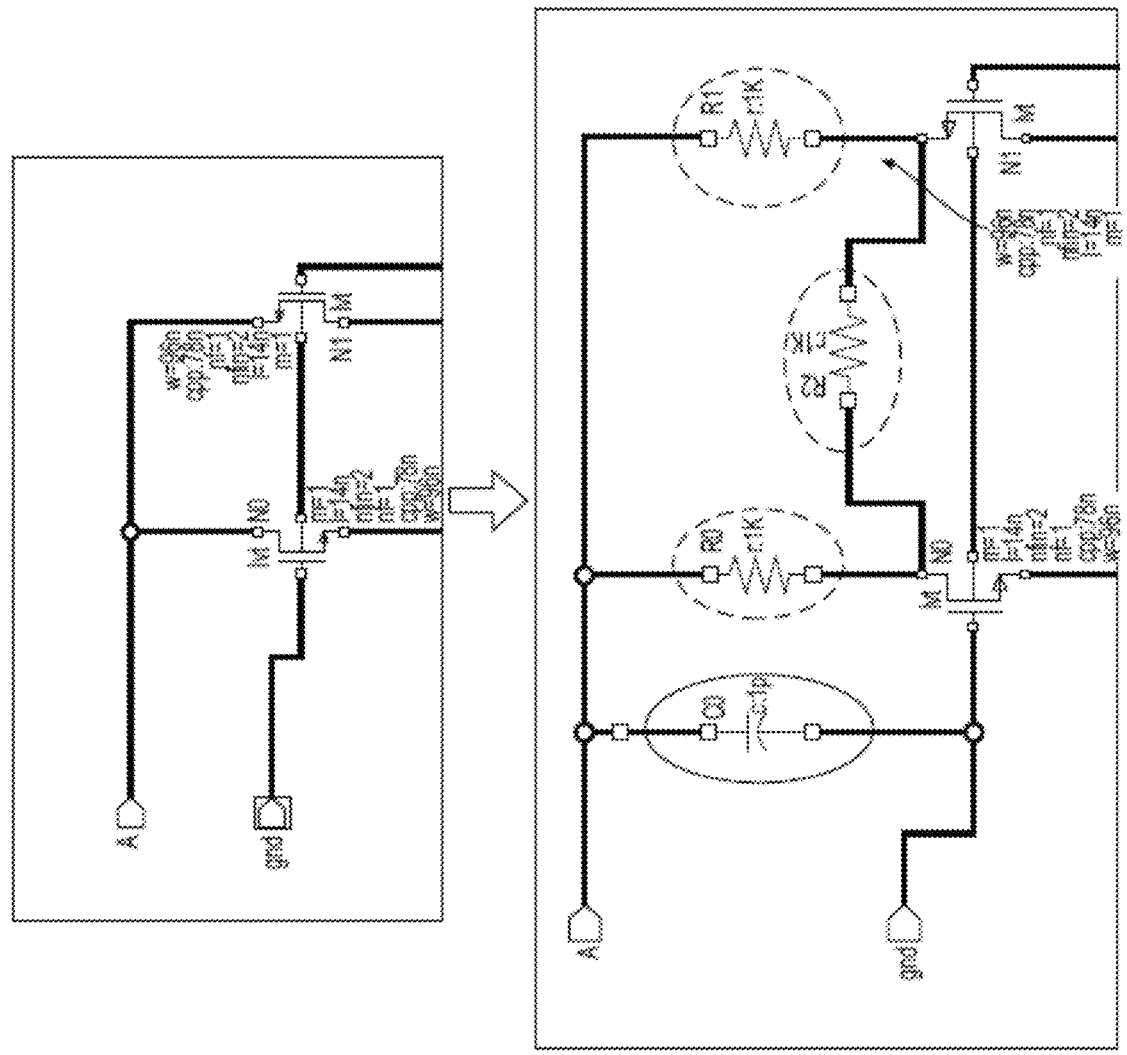
FIG. 15 is a graphical user interface depicting a schematic in accordance with an embodiment of the present disclosure.

Referring now to FIG. 13, flowcharts corresponding to both the resistance training methodology and the capacitance training methodology are provided. FIG. 14 shows a flowchart showing an embodiment of a parasitic prediction and stitching methodology and FIG. 15 shows graphical user interfaces showing an example of parasitic stitching in accordance with embodiments of the present disclosure. In the example of FIG. 15, for a resistance parasitic, if a net is connected to "n" terminals, there may be $^nC_2$ paths and prediction process 10 may generate a mesh network of resistors. Since there may be a path-resistance predicted for every pair of instance-terminals and therefore if a net has "n" terminals, then there would be $^nC_2$ paths and a resistor predicted for each of those $^nC_2$ paths. Alternatively, for a capacitance parasitic, for a given net, prediction process 10 may connect any of the instance terminals of the net to a ground net via a capacitor.

Figure 16:
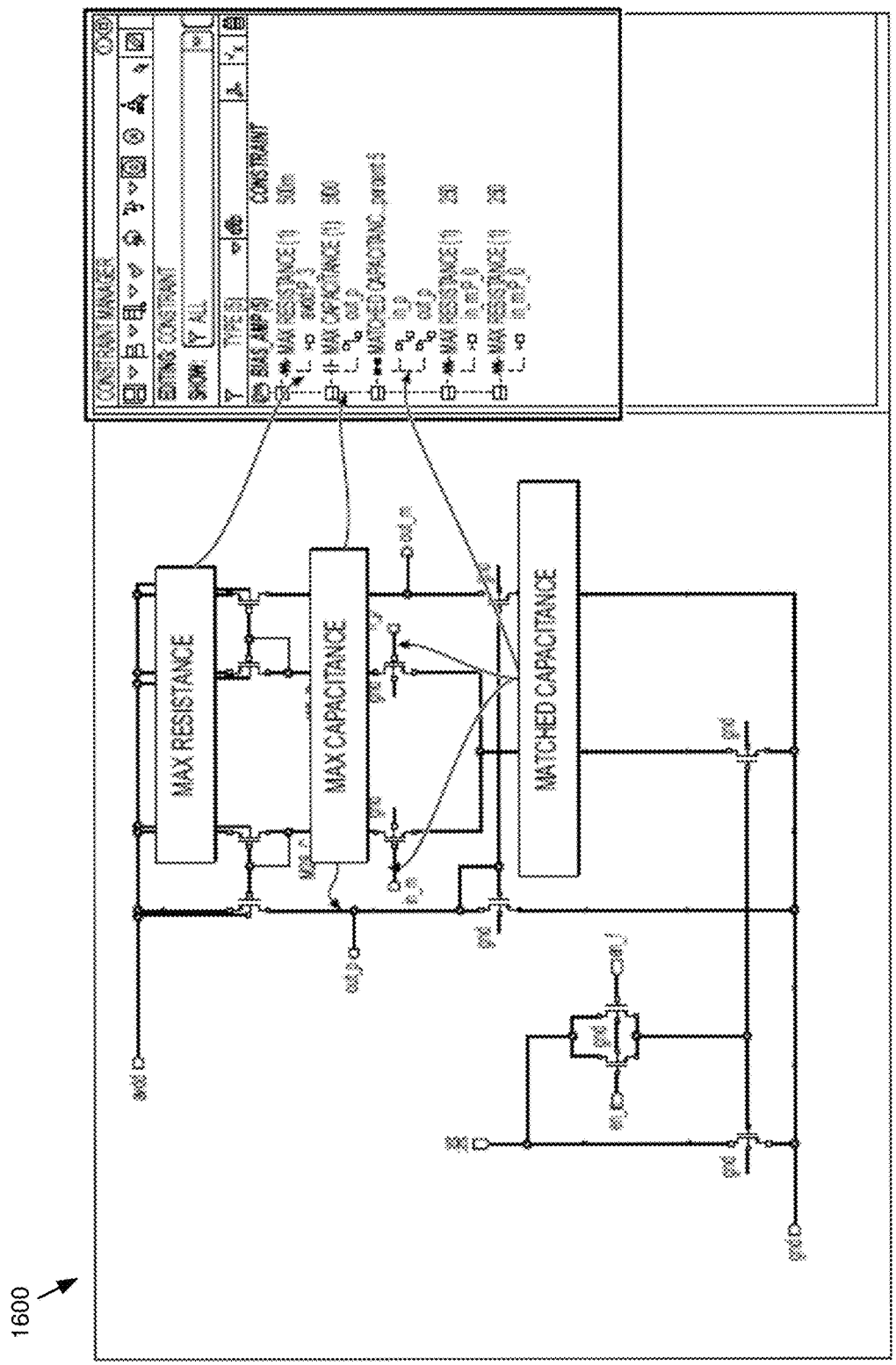
FIG. 16 is a graphical user interface depicting a schematic in accordance with an embodiment of the present disclosure.

Referring now to FIG. 16, an embodiment showing a graphical user interface displaying a schematic is provided. Embodiments of prediction process 10 may be used to utilize one or more predicted parasitics to determine electrical constraints. A predicted resistance value for critical paths may be used to define a Max-R constraint. If the predicted resistance values for two paths are similar or the same, then a matched-resistance constraint may be created to match those paths. A predicted capacitance value for one or more critical nets may be used to define a Max-Cap constraint. If the predicted capacitance values for the two nets are similar or the same, then a Matched-Capacitance constraint may be created to match those nets. Here, "Max-R" may refer to the Maximum-resistance between any two terminals of a net and "Max-Cap" may refer to the Maximum Total Capacitance for a net. These electrical constraints may then be used by placer and router engines associated with EDA application 20 to provide layout results that are more predictable for post-layout simulation.

In some embodiments, the netlist may be represented as Graph Convolutional Network ("GCN"). A GCN is a Deep Learning Model that utilizes graphs as input. The netlist of a schematic is a graphical representation of the circuit, where each instance, pin and net can be treated as a node of the graph and connections between those objects/nodes are treated as edges—thereby transforming the netlist into a graph. The features of the instances, pins and nets are stored as node-attributes. The graph may then be passed as an input to the GCN model. The GCN model contains a sequence of layers that perform transformation of the node features/attributes and finally output the value for the node—e.g. capacitance for a node if the node represents a net object. Each layer of the GCN model contains weights that are tuned during the training process by optimizing the loss-function (e.g. mean-squared error between predicted and actual value for the node).

It will be apparent to those skilled in the art that various modifications and variations can be made in the embodiments of the present disclosure without departing from the spirit or scope of the present disclosure. Thus, it is intended that embodiments of the present disclosure cover the modifications and variations provided they come within the scope of the appended claims and their equivalents.

What is claimed is:

1. A computer-implemented method for electronic design comprising:
   receiving, using at least one processor, an electronic design having an original schematic associated therewith;
   automatically extracting one or more extracted features for each net from the schematic and
   automatically storing one or more parasitic values for each net;
   automatically applying the one or more parasitic values as labels for a machine learning model;
   training the machine learning model using one or more actual parasitic values to generate a trained model;
   receiving the trained model to predict parasitics for a stitching engine; and
   generating a stitched schematic having one or more predicted parasitics inserted between a first net and a second net.

2. The computer-implemented method for electronic design of claim 1, wherein the machine learning model is a resistance model.

3. The computer-implemented method for electronic design of claim 1, wherein the machine learning model is a capacitance model.

4. The computer-implemented method for electronic design of claim 1, wherein training the machine learning model is based upon, at least in part, a random forest learning methodology.

5. The computer-implemented method for electronic design of claim 1, wherein receiving an electronic design includes receiving a placed and routed layout for training the machine learning model and only a schematic for predicting parasitics using the trained model.

6. The computer-implemented method for electronic design of claim 2, further comprising:
predicting one or more resistance values based upon, at least in part, the trained machine learning resistance model.

7. The computer-implemented method for electronic design of claim 3, further comprising:
predicting one or more capacitance values based upon, at least in part, the trained machine learning capacitance model.

8. The computer-implemented method for electronic design of claim 6, further comprising:
generating, without requiring a user to manually add one or more net parasitics, one or more electrical constraints based upon, at least in part, the one or more predicted resistance values.

9. The computer-implemented method for electronic design of claim 7, further comprising:
generating, without requiring a user to manually add one or more net parasitics, one or more electrical constraints based upon, at least in part, the one or more predicted capacitance values.

10. The computer-implemented method for electronic design of claim 1, further comprising:
generating a scratch layout to identify an estimated placement for one or more instances associated with the electronic design.

11. A non-transitory computer-readable storage medium having stored thereon instructions, which when executed by a processor result in one of more operations for electronic design, the operations comprising:
receiving, using at least one processor, an electronic design having an original schematic associated therewith;
automatically extracting one or more extracted features for each net from the schematic and
automatically storing one or more parasitic values for each net;
automatically applying the one or more parasitic values as labels for a machine learning model;
training the machine learning model using one or more actual parasitic values to generate a trained model;
receiving the trained model to predict parasitics for a stitching engine; and
generating a stitched schematic having one or more predicted parasitics inserted between a first net and a second net.

12. The non-transitory computer-readable storage medium of claim 11, wherein the machine learning model is a resistance model.

13. The non-transitory computer-readable storage medium of claim 11, wherein the machine learning model is a capacitance model.

14. The non-transitory computer-readable storage medium of claim 11, wherein training the machine learning model is based upon, at least in part, a random forest learning methodology.

15. The non-transitory computer-readable storage medium of claim 11, wherein receiving an electronic design includes receiving a placed and routed layout for training the machine learning model and only a schematic for predicting parasitics using the trained model.

16. The non-transitory computer-readable storage medium of claim 12, further comprising:
predicting one or more resistance values based upon, at least in part, the trained machine learning resistance model.

17. The non-transitory computer-readable storage medium of claim 13, further comprising:
predicting one or more capacitance values based upon, at least in part, the trained machine learning capacitance model.

18. The non-transitory computer-readable storage medium of claim 16, further comprising:
generating, without requiring a user to manually add one or more net parasitics, one or more electrical constraints based upon, at least in part, the one or more predicted resistance values.

19. The non-transitory computer-readable storage medium of claim 17, further comprising:
generating, without requiring a user to manually add one or more net parasitics, one or more electrical constraints based upon, at least in part, the one or more predicted capacitance values.

20. An electronic design system comprising:
a memory; and
at least one processor configured to receive an electronic design having an original schematic associated therewith and to automatically extract one or more features for each net from the schematic and to store one or more extracted parasitic values for each net and automatically apply the one or more parasitic values as labels for a machine learning model, the at least one processor further configured to train the machine learning model using one or more actual parasitic values to generate a trained model, the at least one processor further configured to receive the trained model to predict parasitics for a stitching engine and generate a stitched schematic having one or more predicted parasitics inserted between a first net and a second net.

\* \* \* \* \*